United States Patent [19]
Krehbiel

[11] Patent Number: 5,995,448
[45] Date of Patent: Nov. 30, 1999

[54] METHOD FOR MAPPING SEISMIC REFLECTIVE DATA

[76] Inventor: Steven Krehbiel, 6678 Ingalls Ct., Arvada, Colo. 80003

[21] Appl. No.: 09/143,182

[22] Filed: Aug. 28, 1998

Related U.S. Application Data

[63] Continuation-in-part of application No. 08/752,902, Nov. 20, 1996, abandoned.

[51] Int. Cl.$^6$ ........................................ G01V 1/34
[52] U.S. Cl. ................... 367/70; 367/68; 367/72
[58] Field of Search ................... 367/68, 70, 72

[56] References Cited

U.S. PATENT DOCUMENTS

| | | | |
|---|---|---|---|
| 4,467,461 | 8/1984 | Rice | 367/70 |
| 4,633,447 | 12/1986 | Bodine | 367/70 |
| 4,843,599 | 6/1989 | Bucker | 367/70 |
| 4,970,699 | 11/1990 | Bucker et al. | 367/70 |
| 5,018,112 | 5/1991 | Pinkerton et al. | 367/70 |

FOREIGN PATENT DOCUMENTS

| | | | |
|---|---|---|---|
| 477363 | 10/1974 | Australia | 367/70 |

*Primary Examiner*—Ian J. Lobo
*Attorney, Agent, or Firm*—Christopher Braddock

[57] ABSTRACT

The invention at hand is a method for mapping two or three dimensional P-wave stacked seismic reflective data, used to identify geophysical characteristics indicative of hydrocarbon, mineral, groundwater supplies and geological faults into a color space. This invention, by accentuating the subtle variations of the seismic waveforms, extends the effective resolution of data interpretation beyond the range allowed by current methodology.

This invention accomplishes this by extracting a suite of measurements form a sequence of fixed time domain operator windows, and then using three measurements to form a multivariate attribute to transform the raw stacked seismic data. The measurements used in the multivariate attribute are selected from a standardized suite, and are amplitude based, autocorrelation function based and waveform shape based, with each combination selected to emphasize certain data characteristics. The nature of seismic data is such that this new method is more efficient and effective than conventional methods of analyzing the waveforms using complex mathematical equations, or methods relying on a single measurement. Each measurement is rigorously defined, mathematically stable and statistically relevant.

15 Claims, 10 Drawing Sheets

(5 of 10 Drawing Sheet(s) Filed in Color)

Collection of conventional stacked data

↓

Collect background information (well control, known geological characteristics).

↓

Determine optimum window size in two way travel time for extracting measurements.

↓

Extract measurements from windows

↓

Display attribute plots for different combinations of indicator measurements and compare to known geology. Look for geophysical artifacts such as tuning, short period multiples

↓

Make final displays, hard copy plots ⟶ Use other methods to refine analysis (modeling, signature variability mapping, AVO, velocity inversion, etc.)

Interpret displays in terms of known control, depositional system.

FIG. 1

METHOD FOR MAPPING SEISMIC REFLECTIVE DATA

This is a continuation-in-part application from application Ser. No. 08/752,902, filed Nov. 20, 1996, now abandoned.

BACKGROUND OF THE INVENTION

1. Field of the Invention

The present invention relates to seismic exploration, and more particularly to a new and improved method of mapping P-wave stacked reflective data to allow for easy interpretation.

2. Discussion of the Prior Art

The goal of seismic exploration is to search for geophysical characteristics indicative of hydrocarbon, mineral, groundwater supplies and geological faults. Normally, an explosive device or means of creating a vibration is directed into the earth. The waveforms, or a portion of the waveforms are reflected back to the surface, and collected. This raw seismic reflective data is then plotted versus depth to map the boundaries of the underlying geological characteristics.

Conventional methods to enhance seismic reflective data include the use of attributes, or single valued measurements extracted from windows within the data. One of the most popular methods uses the Hilbert transform-based attribute values of instantaneous amplitude, frequency and phase, to assist in the creation of specific maps of geophysical characteristics. However, the Hilbert transform method requires the use of long, complex mathematical operators based on sophisticated mathematical equations. These complex equations reduce the overall resolution making it nearly impossible to accurately map the boundaries of geophysical characteristics indicative of hydrocarbon, mineral, groundwater supplies and geological faults. Furthermore, because of the diverse terrain and inhomogeneities through which the waveform travels, interpretation of the data is very subjective.

SUMMARY OF THE INVENTION

The invention at hand relates to a new method for mapping P-wave stacked seismic reflective data which allows for easy interpretation. This invention uses a suite of measurements extracted from a sequence of operator windows to form a multivariate attribute to transform the raw data. This will enhance the resolution such that the geological variations crucial to delineate the stratigraphic traps and other anomalous formations is preserved. This process will reduce the overall subjectivity of interpreting the results, thus giving a more complete and enhanced stratigraphic map of the underlying geophysical properties.

Windowing of geological and geophysical data is a fundamental and established part of the methodology of the geosciences. Currently in Geophysics, two different types window types are used for radically different purposes. (See Robert E. Sheriff, *Encyclopedic Dictionary of Exploration Geophysics,* third edition, 1991) An operator window is used to define data processing methods as time domain digital filtering or for balancing energy decay with increasing depth. Operator windows are based upon mathematical theory. Their fixed size permits the use of values to mathematically and predictably transform the seismic traces from their original form into a derived one. The final product displays a complete transformation of all sample points included in the analysis. These windows are determined from the mathematical necessities needed to perform a transformation operation such as transforming the data in its entirety over the extent of the analysis, which produces an output result which is more easily interpreted for its geological implications than then original input. See E. S. Robinson, *The MIT Geophysical Analysis Group Reports-Predicative Decomposition of Time Series with Applications to Seismic Exploration, Geophysics* Vol. 32 no. 3, June 1967.

An analytical window is defined from parameters determined by the geological data characteristics under scrutiny, rather than by the mathematical necessities needed to perform a transformation operation. These include geological based mapping techniques like the isopach/isochron maps, as well as mapping waveform amplitude variations. Analytical windows are a standard and essential geophysical mapping technique used to separate a zone from the rest of the data, as opposed to perform a transformation with an operator window.

The invention at hand is a method which extends the effective resolution limits of data interpretation beyond the range allowed by current methodology for both two dimensional and three dimensional data. This invention accentuates the subtle variations of the seismic waveforms by combining three separate measurements to form a multivariate attribute used to effect a mathematical transformation operation to map the original P-wave stacked reflection data into a color space. The measurements extracted from small fixed operator windows selected from a standardized suite, with each combination selected to emphasize certain data characteristics. The nature of seismic data is such that this new method is more efficient and effective than conventional methods of analyzing the waveforms using complex mathematical equations, or methods relying on a single measurement. Each measurement is rigorously defined based upon their ability to be mathematically stable and statistically relevant with a small number of sample points and their ability to characterize the subtle behavior of the seismic waveform.

Additionally, this invention will identify the most anomalous portions of the seismic data by first using a suite of measurements to characterize and then using a very sensitive assignment of colors to describe the waveform variations. This will be of interest to both hydrocarbon exploration, where the anomalies are desirable indicators of potential hydrocarbon accumulations, and for engineering applications, where the anomalies may indicate potential hazards. While the causes of the color variations will need to be examined in the context of the known geological background of a particular area, the increased sensitivity of the method reduces the potential for misinterpreting the data. This invention provides a new method which reduces the overall subjectivity of the final interpretation, thus giving more accurate results.

In view of the foregoing it is a primary object of the present invention to provide a method to accurately map geophysical characteristics indicative of hydrocarbon, mineral, groundwater supplies and geological faults, such that stratagraphic traps and other anomalous formations may be discovered. A further object of the invention is to reduce the overall subjectivity of the interpretation of the processed P-wave stacked reflective seismic data. Still another object of the present invention is to extend the resolution of the sub-surface maps beyond what can be obtained through conventional methods. These and other objects of the present invention will become apparent to those familiar with seismic exploration methods, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

This patent application contains at least one drawing executed in color. Copies of this patent with color drawing(s) will be provided by the Patent and Trademark Office upon request and payment of the necessary fee. The accompanying drawings illustrate the complete preferred embodiments of the present invention according to the best modes presently devised for practical application of the principles thereof, and in which:

FIG. 1 is a logic diagram of the present method outlining the representative stages

DETAILED DESCRIPTION OF THE INVENTION

Figure 2:
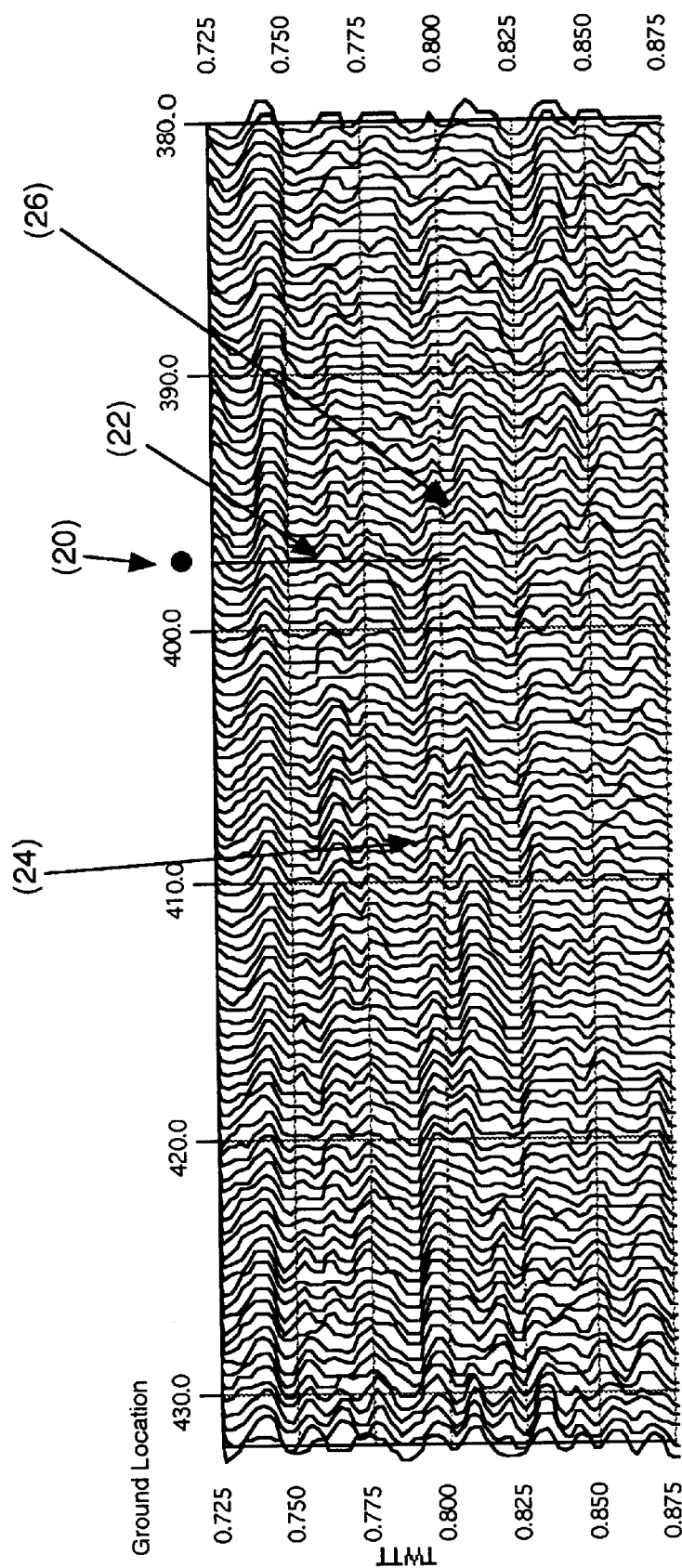
FIG. 2 is an example of a sample P-wave stacked trace of raw stacked data before it has been processed by the invention.

In the drawings like reference numerals throughout the various figures refer to like elements. FIG. 1 is a logic diagram which depicts the representative stages in this method. FIG. 2 is a P-wave stacked trace of raw stacked data before it has been processed by the invention, measured in Two Way Time Travel (TWTT) versus ground location. This plot has been generated from conventional reflected data and shows a Producing Well Symbol 20, a Well Depth Marker 22, the base of the first channel 24, the base of the second channel system 26, and an anomalous geological deposit 28.

Figure 3:
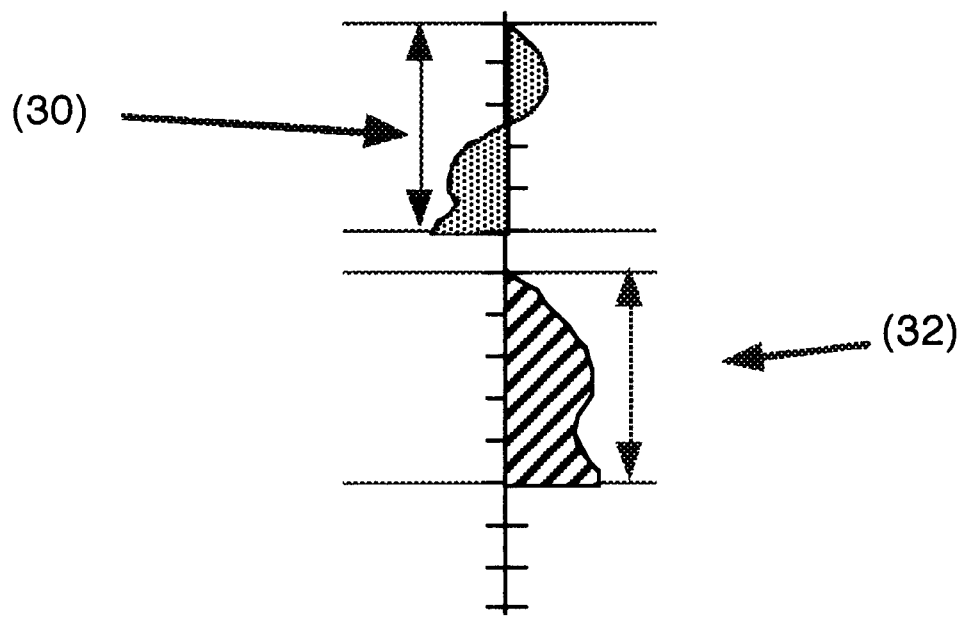
FIG. 3 is a diagram showing two sample windows with a window size of 10 ms. and a sample rate of 2 ms..
Figure 4:
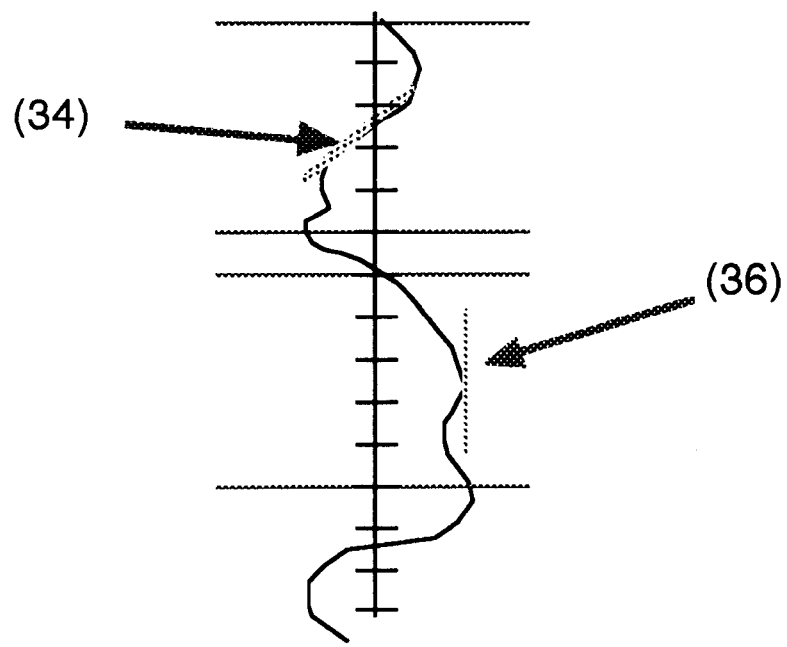
FIG. 4 is a diagram showing two sample windows with a window size of 10 ms. and a sample rate of 2 ms..
Figure 5:
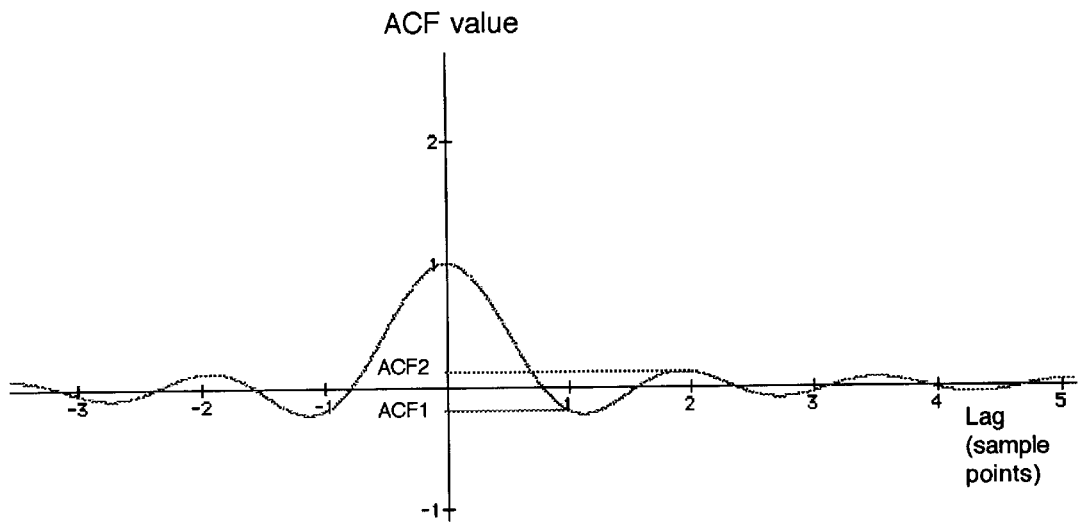
FIG. 5 is a graph of a autocorrelation function for a high frequency reflector.
Figure 6:
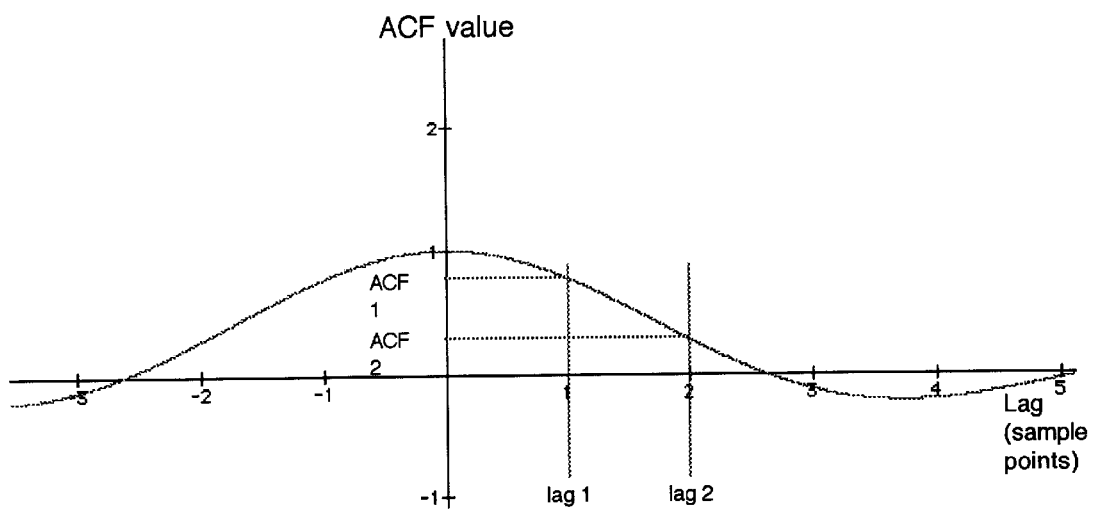
FIG. 6 is a graph of a autocorrelation function for a low frequency reflector.
Figure 7:
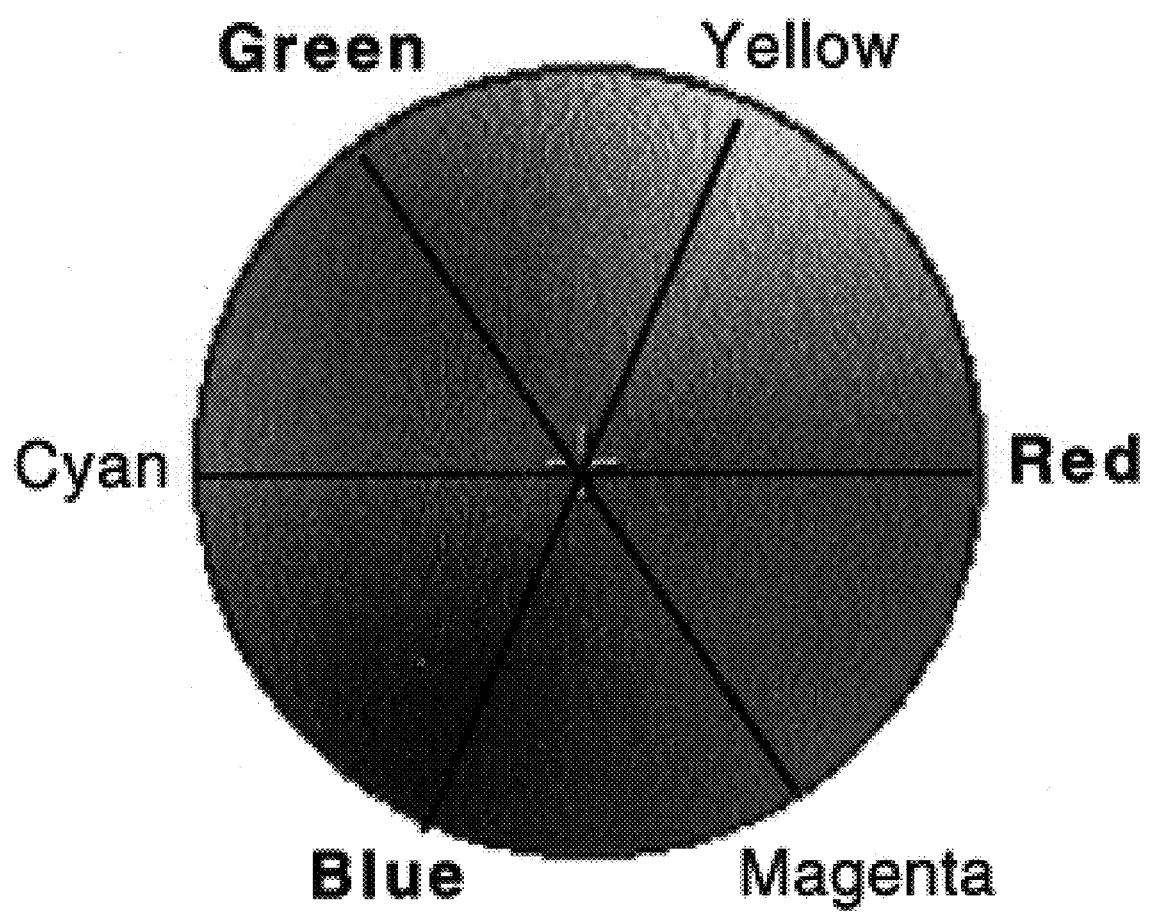
FIG. 7 is a diagram which illustrates the relationship between the primary colors red, blue and green and complimentary colors cyan yellow and magenta.
Figure 8:
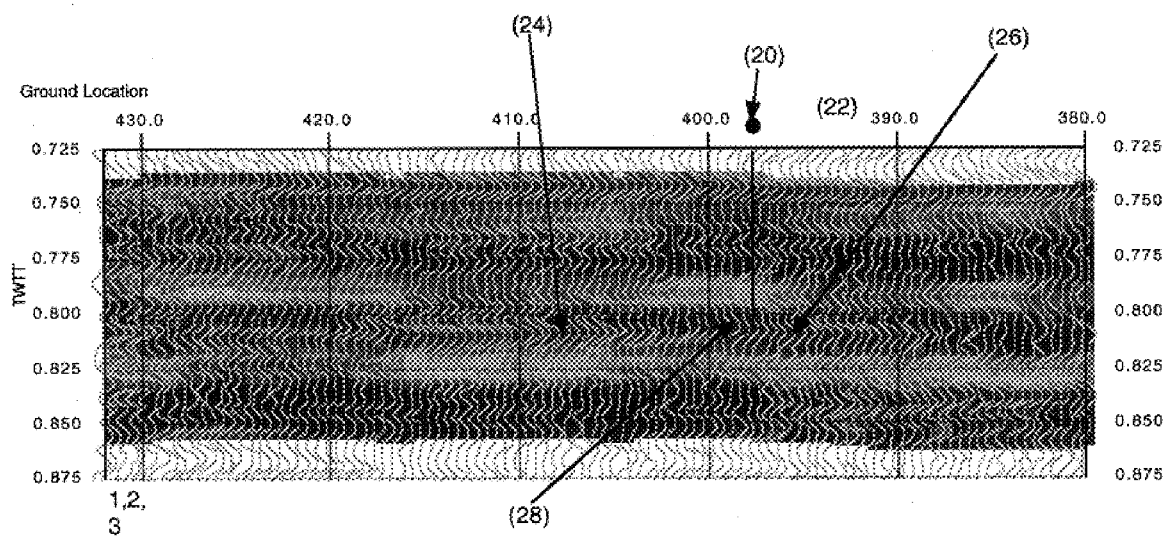
FIG. 8 is an example of a plot of amplitude and phase sensitive measurements superimposed over FIG. 2.

FIG. 3 is a plot of conventional data which has been divided into window 1, 30, and window 2, 32. Each window has 6 sample points and is 12 ms. in duration. This figure also illustrates how the measurements are extracted from each window. For example, the shaded area denotes the Signature energy of the window, which is the area under the curve of the trace. FIG. 4, is a similar plot to FIG. 3 which illustrates how another measurement is extracted. In this case the measurement is the slope at the midpoint of the window. FIG. 5 shows a sample autocorrelation function response to a high frequency reflector. FIG. 6 shows a sample autocorrelation function response to a low frequency reflector. FIG. 7 is a diagram illustrating the relationship between the primary colors red, green and blue (RGB) and the complementary colors cyan, magenta, yellow and black (CMYK). In this representation, all shades of gray, including black and white, would be along and axis through the center of the circle and perpendicular to the plane of the paper. This diagram is helpful in understanding the relative strengths of attribute values based on the colors assigned to each sample point. FIG. 8 is an example of an amplitude and phase sensitive plot, that has been superimposed over the original data illustrated in FIG. 2. FIG. 8 was generated by first extracting the suite of measurements from the data and plotting signature energy, which has been assigned color red, average trace amplitude, which has been assigned green and standard deviation of amplitude, which has been assigned blue, and then superimposing this plot over the original stacked field data. FIG. 8 shows a Producing Well Symbol 20, a Well Depth Marker 22, the base of the first channel 24, the base of the second channel system 26, and an anomalous geological deposit 28.

Figure 9:
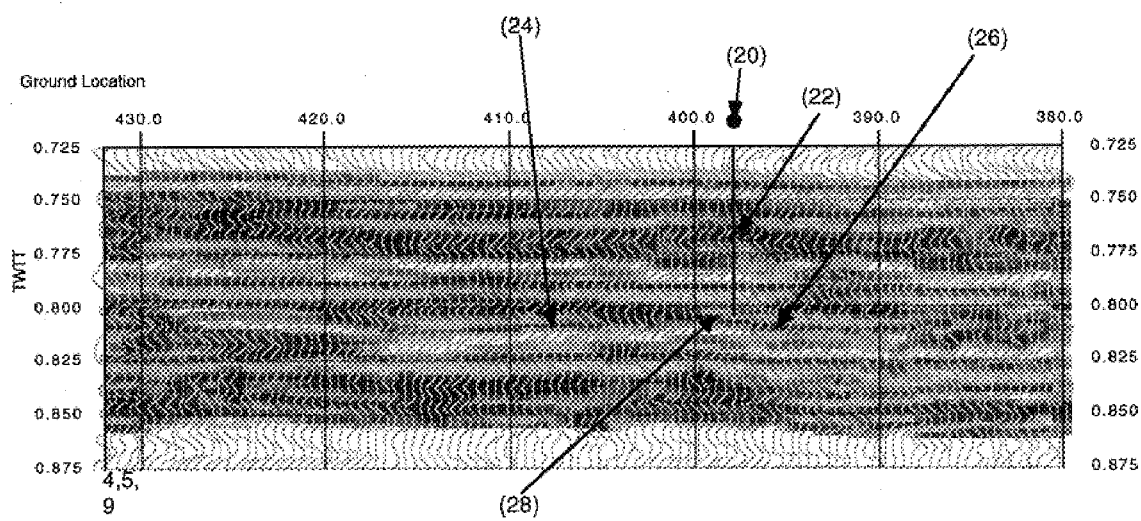
FIG. 9 is an example of a plot of frequency sensitive measurements, with no amplitude effects included, superimposed over FIG. 2.
Figure 10:
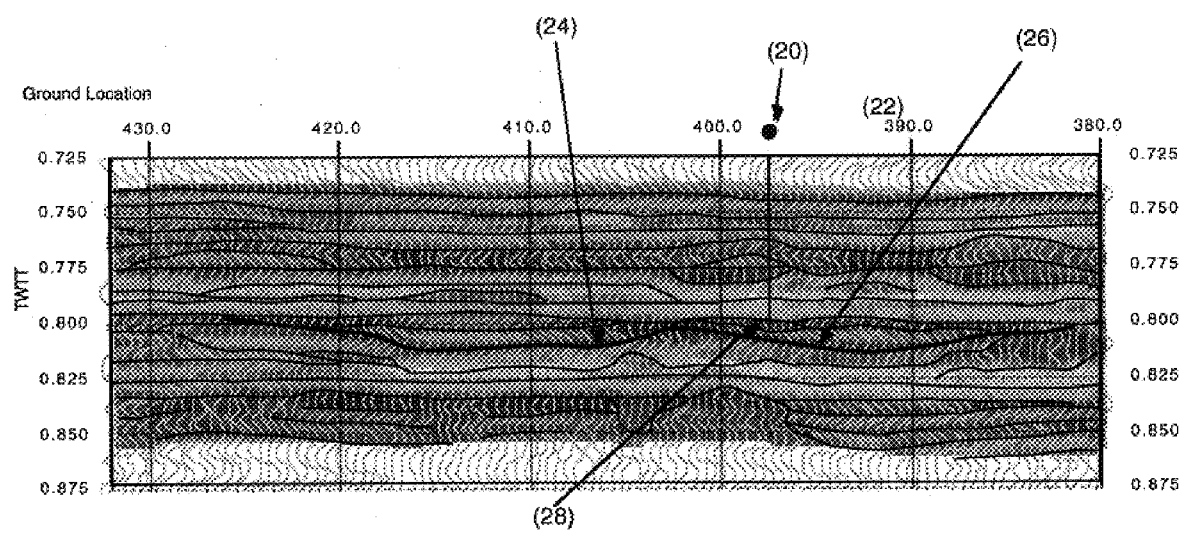
FIG. 10 is an example of a color illustration of a balanced plot, showing major attribute boundaries superimposed over FIG. 2.

FIG. 9, is an example of a frequency sensitive plot that has been superimposed over the original data illustrated in FIG. 2. The measurements which are plotted are the first lag of the autocorrelation function, assigned to red, the second lag of the autocorrelation function assigned to green, and the slope of the wiggle trace at the center of the window assigned to blue. FIG. 9 shows a Producing Well Symbol 20, a Well Depth Marker 22, the base of the first channel 24, the base of the second channel system 26, and an anomalous geological deposit 28. FIG. 10 is an is an example of a color illustration of a balanced plot, showing major attribute boundaries superimposed over FIG. 2. In this example the average trace amplitude has been assigned the color red, while the first autocorrelation function has been assigned the color green and the slope of the trace at the window center has been assigned blue. Again FIG. 10 shows a Producing Well Symbol 20, a Well Depth Marker 22, the base of the first channel 24, the base of the second channel system 26, and an anomalous geological deposit 28.

Figure 11:
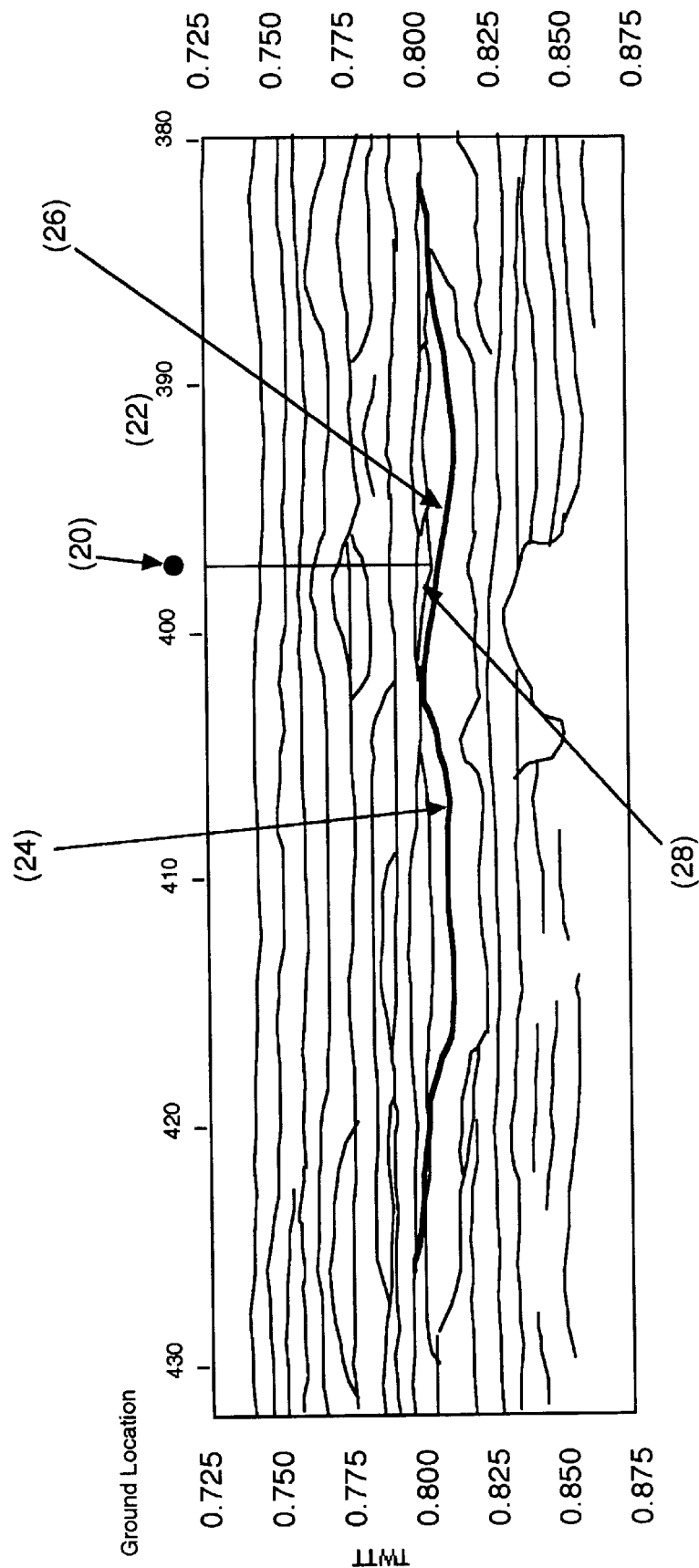
FIG. 11 is an example of a line drawing of a balanced plot, showing major attribute boundaries.
Figure 12:
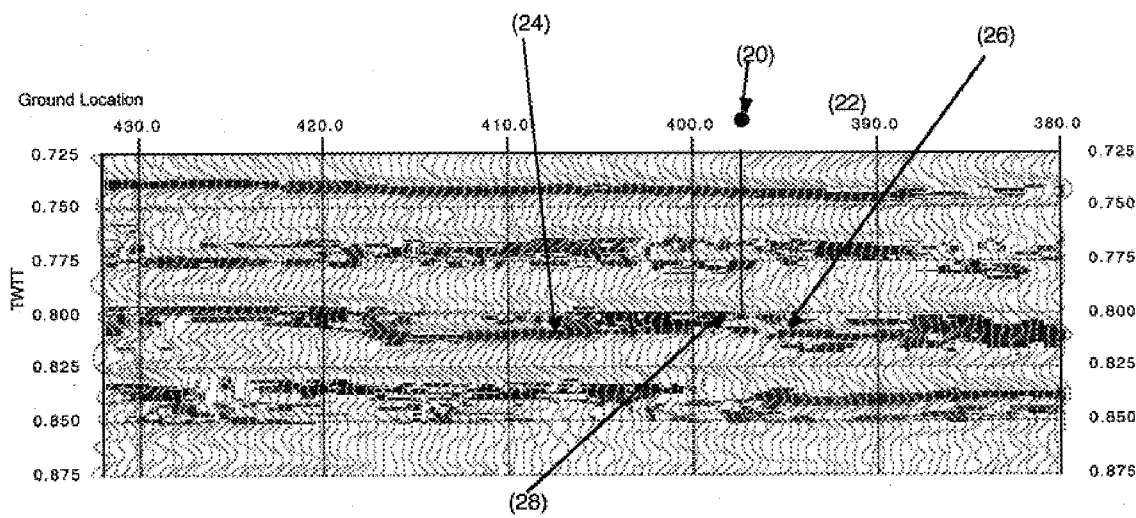
FIG. 12 is an example of a plot of amplitude and phase sensitive measurements superimposed over FIG. 2, that clearly shows two channel systems.

FIG. 11 is an example of a line drawing of a balanced plot, showing major attribute boundaries. The dark line superimposed upon this illustration describes the base of a channel. Again FIG. 11 shows a Producing Well Symbol 20, a Well Depth Marker 22, the base of the first channel 24, the base of the second channel system 26, and an anomalous geological deposit 28. FIG. 12 is an example of a plot of amplitude and phase sensitive measurements superimposed over FIG. 2, that clearly shows two channel systems. Colors at the base of the first channel 24, and the base of the second channel 26, are identified from FIG. 10, then isolated when plotted. Other features above and below the base of the first channel 24, and the base of the second channel 26, represent similar acoustic properties but are not part of the channel system. Again FIG. 12 shows a Producing Well Symbol 20, a Well Depth Marker 22, the base of the first channel 24, the base of the second channel system 26, and an anomalous geological deposit 28.

FIG. 12 plots the data using a restricted color plot. A restricted color plot allows an easy mechanism to search through the data for a particular waveform characteristics. By selecting colors representative of a particular portion of a waveform and applying a tolerance for a search of the selected color, the data volume can be easily and quickly searched for similar waveform characteristics. This procedure can be thought of as using the color space as a rough approximation to a statistical sample space, with closely related statistical characteristics being approximated by similar colors. To use this method the user first defines which color needs to be emphasized. The plot is then redrawn with only the color chosen.

The user first defines a fixed time domain window size, typically ranging in size between 5 and 25 sample points, which corresponds to 10–50 milliseconds (ms) two way travel time (TWTT). Next, the data is divided into a sequence of windows corresponding to the defined window size. For best results, the windows are overlapped. For example, if the time domain window size is fixed at 7 sample points, the first window in the sequence will be from the first sample point to the seventh. The second window in the sequence will be from the second sample point to the eight sample point. This sequence will continue throughout the entire area of interest. Then for each window in the area of interest a suite of measurements is extracted. The user then chooses which three measurements are to be used to describe the small scale waveform characteristic. Three measurements are used because one measurement may be unable to respond adequately to the more subtle nuances of the waveform variations. In order to extract as much diverse information as possible from the small window size, the measurements used are sensitive to frequency, amplitude and phase characteristics. Treating these three measurements together as a group, an accurate characterization of the properties of the seismic signature can be determined. Because this new and improved method relies on a suite of measurements, it more accurately depicts the subtle changes in the sub-surface geology.

These raw stacked values must be scaled to produce a color from the final display. The scaling is done in three steps. First, a calibration subset of the data volume is selected to be representative of the statistical characteristics of the primary zone of interest. If the statistical characteristics are consistent throughout the data volume, the calibration subset might be the entire data volume, however, if the highly anomalous zones exist within the data volume their presence will adversely affect the statistical distribution used in the subsequent scaling procedure and adversely affect the statistical distribution used in the subsequent scaling procedure and degrade the sensitivity in the more important regions. Defining a calibration subset which excludes the anomalous zones eliminates the problem.

Next a list of the 50 largest and smallest values for each of the three components is kept as the operators move throughout the data. When completed these are examined for unusual characteristics or statistical outliers which might also affect the representation of the statistical distribution. A simple average of the largest and the smallest values from the list, in which the user selects the number to average produces a refined set of numbers of the maximum and minimum values for the final scaling step.

The last step uses these refined maximum and minimum values for the color representation. To accomplish this, the refined maximum and minimum values for each component are used to scale the values into the maximum and minimum values used for the digital color representation. While the digital color representation varies from computer color displays, a common range of numbers is 0-65535. A color representation results from a series of three numbers within this range, one for each attribute, such as one for red, one for green and one for blue. Scaling the color transformation is done by taking each refined maximum component value and re-assigning it the value of 65535, and each minimum will be re-assigned the value of 0. All other component values will be linearly scaled to lie within this range to produce the final display.

Since the scaling is dependent on a reasonable representation of the statistical distribution of the component values, statistical sampling theory can be used to efficiently sample the data. In the case of 3D data, the data is organized into a series of sequential, adjacent data locations into what are equivalent to a series of 2D profiles called in-line segments. Since the volume of data can be extremely large, a considerable improvement in efficiency can be achieved by sampling some regularly spaced increment of the total number of in-line segments. Since the scaled measurements will almost always show some degree of correlation, the resulting color will be a composite color showing the interrelationships. For example, an equal contribution of the first (red) and second (green) scaled measurements, with no blue, will produce a yellow color, and equal contributions from all three will produce a shade of gray.

These colors can be used to produce a graphical display which is extremely sensitive to the sub-surface geological properties. The best plots show a fairly wide range of colors with a high degree of contrast, implying that the constituent measurements are each conveying information unique from the others. Also, while the frequency, amplitude, and phase measurements cannot be directly isolated with this technique, combinations of the measurements can be selected which are primarily sensitive to these parameters. These more highly correlated measurements can be used to generate specialized plots to accentuate these characteristics of the data. For example, a plot emphasizing amplitude effects might be useful in areas where the presence of gas in a porous zone may have affected the reflectivity, or a plot emphasizing frequency might be useful to emphasize lateral coherency of the response to stratagraphic layers. The invention at hand provides the option to empirically determine the most effective series of displays for a particular geologic province.

The display is usually a combination of these colors superimposed over the original stacked seismic section for 2D data. For 3D data the colors are superimposed over a verticle profile or as a time slice. Additionally, other color schemes can be used besides the RGB color displays. For example, primary colors can be defined as combinations of cyan, yellow, magenta and black (hereinafter "CMYK") as easily as RGB. Because CMYK is the color combination of printer inks, this color space can produce more accurate prints of the data.

The window size is critical; for instance if the window is large with respect to a waveform, the resulting data may not respond accurately to the small scale geological variations, and thus be misleading. Correspondingly, a very small window relative to the size of the dominant wavelength may not contain enough information to respond to the more subtle geological changes. A good compromise is to set the window size between 7 and 11 sample points, recorded at a 2 ms. sample rate. Since each window is composed of a number of sample points, it will have a set of statistical characteristics which can be used to characterize the sub-surface properties of the particular window. It is important to remember that this method is designed to work with as small a window size as possible, in order to be most responsive to the small geologic features, and each sample point will have its own suite of measurements which can be used to produce a characterization of the underlying geological properties.

The suite of measurements which are extracted from the windows are usually fixed, but can be modified for special situations. The standard measurements are: amplitude based (Signature Energy, Natural Logarithm of Signature Energy, Average Trace Amplitude, Standard Deviation of Trace Amplitude); autocorrelation based (First Lag of Autocorrelation Function, Second Lag of the Autocorrelation Function, Fourth Lag of Autocorrelation Function, First Zero Crossing of Autocorrelation Function, Second Derivative of Autocorrelation Function at Window Center, Second Lag of the Partial Autocorrelation Function); and waveform shape based (First Derivative at Window Center, Second Derivative at Window Center, Radius of Curvature at Window Center, Natural Logarithm of Radius of Curvature at Window Center). However, any measurement which is statistically relevant and mathematically stable relative to the small number of data points can be extracted.

Signature energy and average amplitude give the most direct indication of the reflectivity within the window, while the trace amplitude's standard deviation is responsive to the complexity of the signature. The Autocorrelation Function is a commonly used geophysical tool, and is a measurement of the similarity of a signature to itself. The mechanism of the calculation can be thought of as sliding a copy of the signature past itself, while repeatedly calculating a correlation value between the two at equal increments, or lags, between the stationary signature an the sliding one. For geophysical purposes, the lag increment is the sample interval of the recorded trace. Autocorrelation Function based values are primarily sensitive to the frequency characteristics of the signature and their effects of the signature shape, with some response to minor phase shifts. There is no sensitivity to amplitude at all. Plots generated with a mix of these values with the amplitude based ones generally produce the most detailed plots.

The Partial Autocorrelation Function is a variant of the Autocorrelation Function, except intervening lags are taken into account. It is not a standard geophysical measurement, but is often used in statistical time series analysis and modeling. In this application, it shows an increased sensitivity to the frequency and phase characteristics than does the Autocorrelation Function, but the values derived from it, partly as a consequence of this sensitivity, are somewhat noisy. The First Derivative at Window Center, Second Derivative at Window Center and the Radius of Curvature at Window Center are direct measurements of the waveform signature shape and can show sensitivity to frequency, amplitude and phase characteristics.

By carefully selecting values from the available measurements, particular data characteristics which may be of interest can be emphasized. For example, a group of amplitude based measurements may be selected to display overall reflectivity and energy content. In most cases, though, a group which is balanced between frequency, amplitude and phase characteristics will give the best response to show the stratagraphic subtleties.

To visually represent the processed data, a series of plots are generated with depth in milliseconds as the y-axis and ground location as the x-axis. For 3D a series of plots or time slices are generated with depth as the z-axis and ground location as the x and y axis. The user then decides which three measurements to treat together and plot. This allows the characterization of the data to be accomplished by treating the three measurements as a group of differing values, but ones which have some level of interrelationships or correlation.

It is important to remember that while the colors are assigned to a single point at the center of the window, they are obtained from trace values from the entire window. Additionally, it is important to understand the interrelationships between the three values based on the resulting composite colors. If the values were completely independent of each other, the only colors displayed will be shades of the three primary colors, red, green and blue. Because of the correlation between the measurements, secondary colors will always appear. Thus, a passing knowledge of how the primary colors combine to form composite colors is useful in unraveling these situations. For example, in a RGB plot black results when all three values are at a minimum, while white is caused when they are all at a maximum. Shades of gray are caused by three values that are all about the same relative point within their range, giving RGB values that are approximately equal.

As an example of these interrelationships, assume a plot is generated using values of signature energy and two auto-correlation values, assigned to red, green and blue respectively. In this case, a white or light gray shade would indicate a combination of high energy together with low frequency, since both the energy value will be high and the Autocorrelation function values will be close to their maximum value of 1 at short lags for low frequencies. Alternatively, a red streak occurring near a light colored anomaly implies that a higher frequency signature has been detected within a highly reflective zone, allowing the amplitude value to dominate the lower Autocorrelation Function values. This effect might be an indication of a transition between radically different rock types.

For 2D final plotting parameters are usually set to match the plotting parameters of the stacked seismic section, with the colors superimposed over the traces. In some cases, highly compressed displays may be desirable by plotting the colors only, without plotting the traces themselves. The standard display uses an RGB color scheme, but can be converted to alternate ones. A display based on the colors cyan, yellow and magenta (CMYK) can sometimes provide a different appearance to the final display which may accentuate a particular feature, even though the data itself is the same. Additionally, this scheme can give a more accurate paper print of the display since this is the color scheme used by most color plotters. A final option for display is to use image enhancement techniques to improve the visual appearance of the plot, such as re-sampling the grid of the colors to a finer interval.

While this approach accentuates and displays variations in the complete geophysical response, it makes no attempt to separate the coherent noise and other artifacts of the geophysical response from the more useful geologic response. Since the conventional data processing effort is designed to eliminate these artifacts, this is normally not a problem. Also, the approach will not produce values which can be directly interpreted as rock properties. Instead, it is designed to give a display which is representative of the changes in waveforms caused by the variations of the geological depositional system of the play with as much sensitivity as possible.

It will now be understood that what has been disclosed herein includes a new method for processing and displaying seismic reflection data, which is particularly advantageous in the geophysical market. Those having skill in the art to which the present invention relates will now as a result of the teaching herein perceive various modifications and additions which may be made to the invention. Accordingly, all such modifications and additions are deemed to be within the scope of the invention which is to be limited only by the claims.

What is claimed is:

1. A method for mapping two or three dimensional P-wave stacked seismic reflective data, used to identify geophysical characteristics indicative of hydrocarbon, mineral, groundwater supplies and geological faults into a color space, comprising the steps of:
   a. defining an area of interest in the raw data;
   b. defining a fixed operator window size for said area of interest;
   c. extracting a suite of measurements from said fixed operator window;
   d. incrementing to the next fixed operator window in said area of interest;
   e. repeating steps c, and d throughout the entirety of said area of interest;
   d. choosing three measurements from said suite of measurements;
   e. forming a multivariate attribute from said three measurements;
   f. transforming said raw data into transformed data using said multivariate attribute;
   g. defining a calibration subset which excludes the anomalous zones from said transformed data;
   h. average a plurality of the largest values contained in said calibration subset to produce the refined maximum value and average a plurality of the smallest values contained in said calibration subset to produce the refined minimum value;
   i. assigning a different color to each of said three measurements;
   j. re-assign said refined maximum values to 65,535 and re-assign said refined minimum values to 0;
   k. scale said transformed data linearly between said re-assigned refined maximum values and said re-assigned refined minimum values; and
   l. plot said scaled data.

2. A method for mapping two or three dimensional P-wave stacked seismic reflective data, used to identify geophysical characteristics indicative of hydrocarbon, mineral, groundwater supplies and geological faults into a color space of claim 1, wherein said suite of measurements essentially consisting of the groups of Signature Energy, Average Trace Amplitude, Standard Deviation of Trace Amplitude, First Lag of Autocorrelation Function, Second Lag of Autocorrelation Function, Fourth Lag of Autocorrelation Function, First Zero Crossing of Autocorrelation, Second Derivative of Autocorrelation Function at Window Center, Second Lag of the Partial Autocorrelation Function, First Derivative at Window Center, Second Derivative at Window Center, Radius of Curvature at Window Center, Natural Logarithm of Radius Curvature at Window Center.

3. A method for mapping two or three dimensional P-wave stacked seismic reflective data, used to identify geophysical characteristics indicative of hydrocarbon, mineral, groundwater supplies and geological faults into a color space of claim 1, wherein said suite of measurements includes any measurement that is statistically relevant and mathematically stable.

4. A method for mapping two or three dimensional P-wave stacked seismic reflective data, used to identify geophysical characteristics indicative of hydrocarbon, mineral, groundwater supplies and geological faults into a color space of claim 1, wherein said three measurements are each assigned a distinct color from the group red, green and blue.

5. A method for mapping two or three dimensional P-wave stacked seismic reflective data, used to identify geophysical characteristics indicative of hydrocarbon, mineral, groundwater supplies and geological faults into a color space of claim 1, wherein said three measurements are each assigned a distinct color from the group cyan, yellow, magenta and black.

6. A method for mapping two or three dimensional P-wave stacked seismic reflective data, used to identify geophysical characteristics indicative of hydrocarbon, mineral, groundwater supplies and geological faults into a color space of claim 1, wherein said plot is a plot of depth versus ground location.

7. A method for mapping two or three dimensional P-wave stacked seismic reflective data, used to identify geophysical characteristics indicative of hydrocarbon, mineral, groundwater supplies and geological faults into a color space of claim 1, wherein said fixed operator window size is from 7 to 11 sample points, recorded at a 2 ms. sample rate.

8. A method for mapping two or three dimensional P-wave stacked seismic reflective data, used to identify geophysical characteristics indicative of hydrocarbon, mineral, groundwater supplies and geological faults into a color space, comprising the steps of:
   a. defining an area of interest in the raw data;
   b. defining a fixed operator window size for said area of interest;
   c. extracting a suite of measurements from said fixed operator window;
   d. incrementing to the next fixed operator window in said area of interest, whereby said next fixed operator window overlaps said fixed operator window;
   e. repeating steps c, and d throughout the entirety of said area of interest;
   d. choosing three measurements from said suite of measurements;
   e. forming a multivariate attribute from said three measurements;
   f. transforming said raw data into transformed data using said multivariate attribute;
   g. defining a calibration subset which excludes the anomalous zones from said transformed data;
   h. average a plurality of the largest values contained in said calibration subset to produce the refined maximum value and average a plurality of the smallest values contained in said calibration subset to produce the refined minimum value;
   i. assigning a different color to each of said three measurements;
   j. re-assign said refined maximum values to 65,535 and re-assign said refined minimum values to 0;
   k. scale said transformed data linearly between said re-assigned refined maximum values and said re-assigned refined minimum values; and
   l. plot said scaled data.

9. A method for mapping two or three dimensional P-wave stacked seismic reflective data, used to identify geophysical characteristics indicative of hydrocarbon, mineral, groundwater supplies and geological faults into a color space of claim 8, wherein said suite of measurements essentially consisting of the groups of Signature Energy, Average Trace Amplitude, Standard Deviation of Trace Amplitude, First Lag of Autocorrelation Function, Second Lag of Autocorrelation Function, Fourth Lag of Autocorrelation Function, First Zero Crossing of Autocorrelation, Second Derivative of Autocorrelation Function at Window Center, Second Lag of the Partial Autocorrelation Function, First Derivative at Window Center, Second Derivative at Window Center, Radius of Curvature at Window Center, Natural Logarithm of Radius Curvature at Window Center.

10. A method for mapping two or three dimensional P-wave stacked seismic reflective data, used to identify geophysical characteristics indicative of hydrocarbon, mineral, groundwater supplies and geological faults into a color space of claim 8, wherein said suite of measurements includes any measurement that is statistically relevant and mathematically stable.

11. A method for mapping two or three dimensional P-wave stacked seismic reflective data, used to identify geophysical characteristics indicative of hydrocarbon, mineral, groundwater supplies and geological faults into a color space of claim 8, wherein said three measurements are each assigned a distinct color from the group red, green and blue.

12. A method for mapping two or three dimensional P-wave stacked seismic reflective data, used to identify geophysical characteristics indicative of hydrocarbon, mineral, groundwater supplies and geological faults into a color space of claim 8, wherein said three measurements are each assigned a distinct color from the group cyan, yellow, magenta and black.

13. A method for mapping two or three dimensional P-wave stacked seismic reflective data, used to identify geophysical characteristics indicative of hydrocarbon, mineral, groundwater supplies and geological faults into a color space of claim 8, wherein said plot is a plot of depth versus ground location.

14. A method for mapping two or three dimensional P-wave stacked seismic reflective data, used to identify geophysical characteristics indicative of hydrocarbon, mineral, groundwater supplies and geological faults into a color space of claim 8, wherein said fixed operator window size is from 7 to 11 sample points, recorded at a 2 ms. sample rate.

15. A method for mapping two or three dimensional P-wave stacked seismic reflective data, used to identify geophysical characteristics indicative of hydrocarbon, mineral, groundwater supplies and geological faults into a color space of claim 8, wherein said next fixed operator window overlaps said fixed operator window substantially.

* * * * *